(12) United States Patent
Matsuda

(10) Patent No.: US 11,201,792 B2
(45) Date of Patent: Dec. 14, 2021

(54) MANAGEMENT SYSTEM AND CONTROL METHOD

(71) Applicant: CANON KABUSHIKI KAISHA, Tokyo (JP)

(72) Inventor: Kotaro Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 15/804,848

(22) Filed: Nov. 6, 2017

(65) Prior Publication Data

US 2018/0131573 A1    May 10, 2018

(30) Foreign Application Priority Data

Nov. 8, 2016   (JP) .............................. JP2016-218210

(51) Int. Cl.
| G06F 15/173 | (2006.01) |
| H04L 12/24 | (2006.01) |
| H04N 1/00 | (2006.01) |
| H04N 1/44 | (2006.01) |
| H04L 29/06 | (2006.01) |
| H04L 12/26 | (2006.01) |
| H04L 29/08 | (2006.01) |

(52) U.S. Cl.
CPC .......... *H04L 41/12* (2013.01); *H04L 41/0253* (2013.01); *H04L 41/14* (2013.01); *H04L 41/28* (2013.01); *H04L 43/0817* (2013.01); *H04L 63/00* (2013.01); *H04L 63/107* (2013.01); *H04N 1/00344* (2013.01); *H04N 1/4433* (2013.01); *H04L 41/22* (2013.01); *H04L 67/02* (2013.01); *H04N 2201/0094* (2013.01)

(58) Field of Classification Search
CPC .............................. H04L 41/12; H04L 63/107
See application file for complete search history.

(56) References Cited

U.S. PATENT DOCUMENTS

| 8,219,598 | B1 * | 7/2012 | Appleton ............ G06F 21/6263 707/705 |
| 2003/0177236 | A1 * | 9/2003 | Goto ................. H04L 29/12009 709/225 |
| 2008/0189757 | A1 * | 8/2008 | Schackow ............... G06F 21/53 726/1 |

(Continued)

FOREIGN PATENT DOCUMENTS

| CN | 101388768 A | 3/2009 |
| CN | 101917286 A | 12/2010 |

(Continued)

*Primary Examiner* — Hua Fan
(74) *Attorney, Agent, or Firm* — Canon U.S.A., Inc. IP Division

(57) ABSTRACT

A management system configured to manage device information responds, if an acquisition request for device information is received from an information processing terminal, to the information processing terminal with information for displaying the device information and script information including a command to cause the information processing terminal to check whether access to a web server implemented on the device is permitted. The information processing terminal is configured to, if the access to the web server implemented on the device is not permitted due to execution of the command included in the script information, be restricted from accessing the web server implemented on the device.

6 Claims, 13 Drawing Sheets

(56) References Cited

U.S. PATENT DOCUMENTS

2014/0373138 A1* 12/2014 Park ................ H04L 63/08
726/22

FOREIGN PATENT DOCUMENTS

| CN | 104853057 A | 8/2015 |
|---|---|---|
| JP | 2003-330824 A | 11/2003 |
| JP | 3862604 B2 | 12/2006 |

* cited by examiner

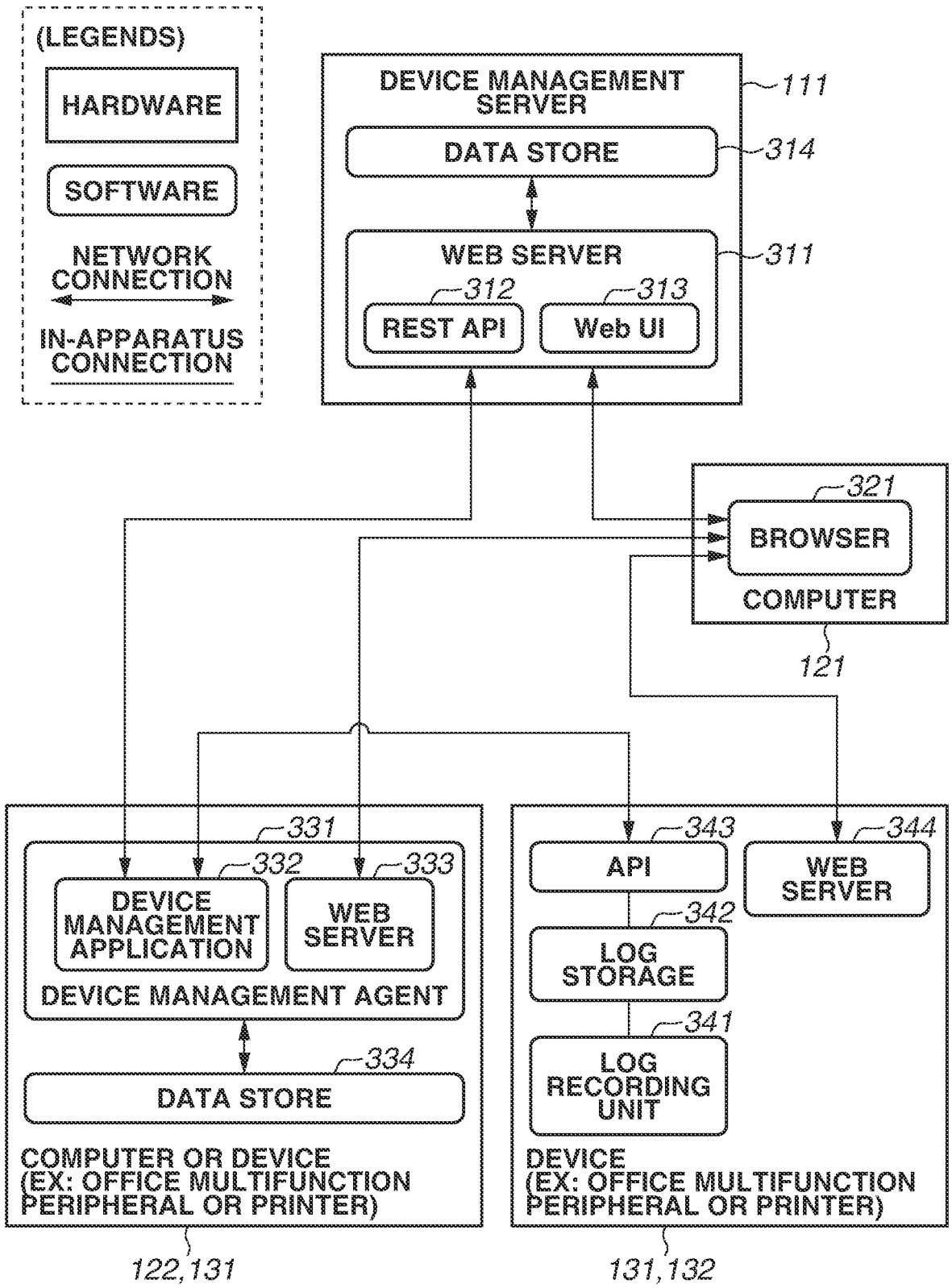

FIG.4A

DEVICE MANAGEMENT SERVICE

CUSTOMER TENANT NAME: ABC COMPANY LIMITED    CUSTOMER TENANT ID: 1001AA ~401

DEVICE LIST

| SERIAL NUMBER | MANUFACTURER | PRODUCT NAME | IP ADDRESS | STATUS | DEVICE TYPE | AGENT TO COMMUNICATE |
|---|---|---|---|---|---|---|
| MDX78461 | α | OfficePrinter 5 | 192.168.0.201 | OPERATING | MFP | PC Agent 001 |
| PMD22670 | α | LBP 8R | 192.168.0.202 | OPERATING ⚠ | MFP | PC Agent 001 |
| OLY37552 | α | PhotoDevice P1 | 192.168.0.203 | COMMUNICATION FAILED ✕ | LFP | PC Agent 001 |
| OACBXV206650 | β | ProDevice 11G | 192.168.1.201 | OPERATING | MFP | PC Agent 002 |
| CPM11808 | α | BussinessIJ J9 | 192.168.1.202 | OPERATING | BIJ | PC Agent 002 |
| PRD20168 | α | OfficePrinter C7 | 192.168.5.31 | OPERATING | MFP | Dev Agent 101 |
| ... | ... | ... | ... | ... | ... | ... |

DEVICE MANAGEMENT SERVICE

CUSTOMER TENANT NAME: ABC COMPANY LIMITED    CUSTOMER TENANT ID: 1001AA ~401

AGENT LIST

| AGENT TYPE | VERSION | AGENT ID | AGENT NAME | IP ADDRESS | STATUS | DATE AND TIME OF LAST COMMUNICATION | NUMBER OF DEVICES TO MANAGE |
|---|---|---|---|---|---|---|---|
| PC Agent | 5.0.2 | 6c3ec85e-5078-11e6-beb8-9e71128cae77 | PC Agent 001 | 192.168.0.11 | OPERATING | 2016-07-23 T11:23:55 | 52 |
| PC Agent | 5.0.5 | 000530b1-8ad1-45c5-a22c-32d11b3f2534 | PC Agent 002 | 192.168.1.71 | OPERATING | 2016-07-23 T12:45:03 | 28 |
| Device Agent | 5.0 | PRD20168 | Dev Agent 101 | 192.168.5.31 | OPERATING | 2016-07-22 T22:05:01 | 5 |

DEVICE MANAGEMENT SERVICE — 500

CUSTOMER TENANT NAME: ABC COMPANY LIMITED    CUSTOMER TENANT ID: 1001AA — 401

DEVICE LIST — 502

| SERIAL NUMBER | MANUFACTURER | PRODUCT NAME | IP ADDRESS | STATUS | DEVICE TYPE | AGENT TO COMMUNICATE |
|---|---|---|---|---|---|---|
| MDX78461 | α | OfficePrinter 5 | 192.168.0.201 | OPERATING | MFP | PC Agent 001 |
| PMD22670 | α | LBP 8R | 192.168.0.202 | OPERATING ⚠ | MFP | PC Agent 001 |
| OLY37552 | α | PhotoDevice P1 | 192.168.0.203 | COMMUNICATION FAILED ✖ | LFP | PC Agent 001 |
| OACBXV206650 | β | ProDevice 11G | 192.168.1.201 | OPERATING | MFP | PC Agent 002 |
| CPM11808 | α | BussinessIJ J9 | 192.168.1.202 | OPERATING | SFP | PC Agent 002 |
| PRD20168 | α | OfficePrinter C7 | 192.168.5.31 | OPERATING | MFP | Dev Agent 101 |
| ... | ... | ... | ... | ... | ... | ... |

510 — DEVICE MANAGEMENT SERVICE

CUSTOMER TENANT NAME: ABC COMPANY LIMITED    CUSTOMER TENANT ID: 1001AA ~401

DETAILED DEVICE INFORMATION

COMMUNICATION ERROR IS DETECTED FROM THIS DEVICE.
TO ATTEMPT CONNECTION TO WEB SERVER OF THIS DEVICE, CLICK THE FOLLOWING LINK: 192.168.0.203 ~513

☐ DEVICE INFORMATION ~511                                           ~514

| SERIAL NUMBER | MANUFACTURER | PRODUCT NAME | IP ADDRESS | STATUS | DEVICE TYPE | AGENT TO COMMUNICATE |
|---|---|---|---|---|---|---|
| OLY37552 | α | PhotoDevice P1 | 192.168.0.203 | COMMUNICATION FAILED ⓧ | LFP | PC Agent 001 |

☐ DETAILED STATUS ~512

ⓧ COMMUNICATION FAILURE HAS BEEN DETECTED (ERROR CODE: E-CEE00001)

SEVERITY LEVEL: ERROR    DATE AND TIME OF OCCURRENCE: 2016-07-23T11:23:55    DATE AND TIME OF RECOVERY: NOT RECOVERED

⚠ NO REMAINING TONER (CYAN)

SEVERITY LEVEL: WARNING    DATE AND TIME OF OCCURRENCE: 2016-07-22T14:34:00    DATE AND TIME OF RECOVERY: 2016-07-22T14:57:23

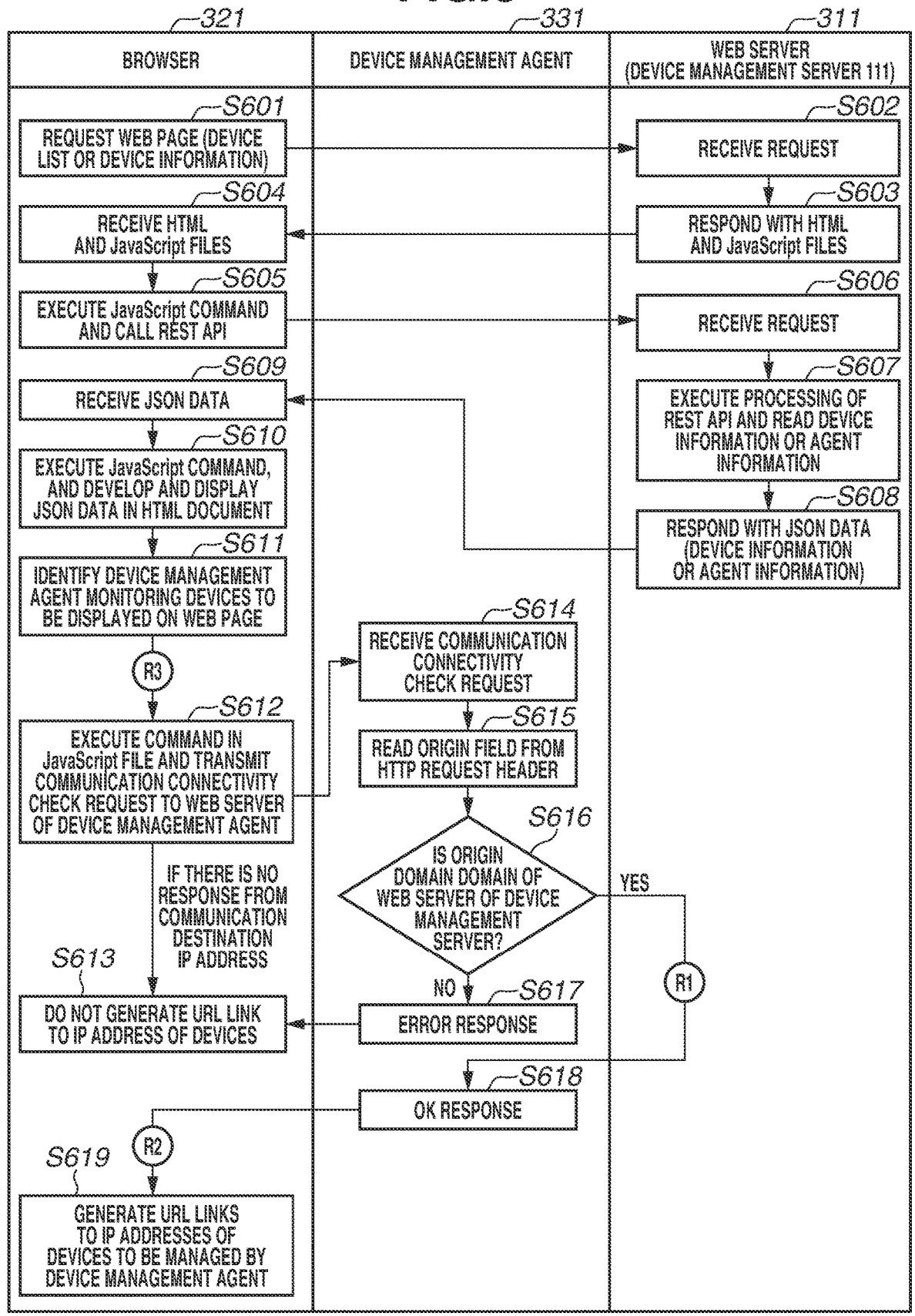

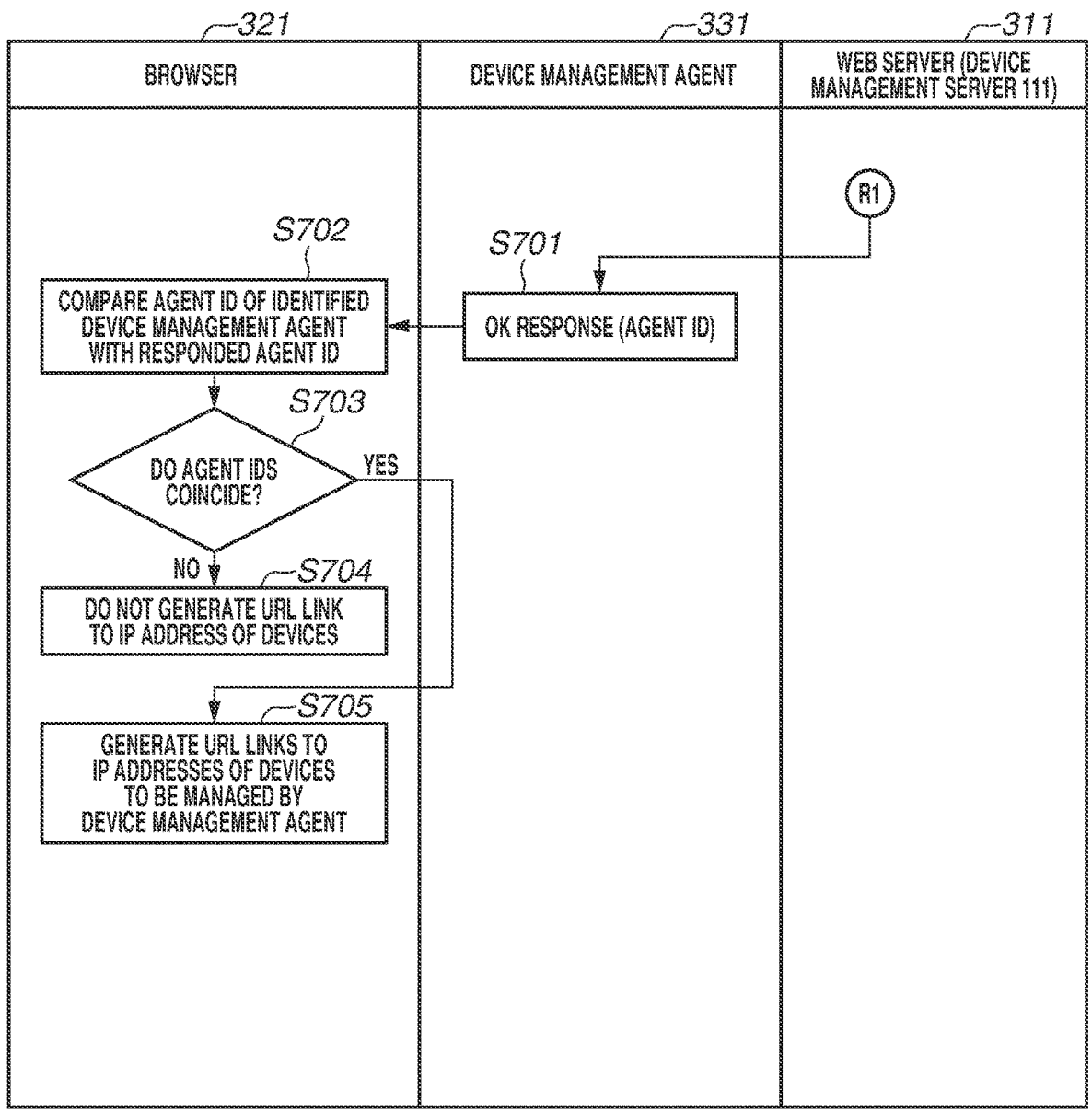

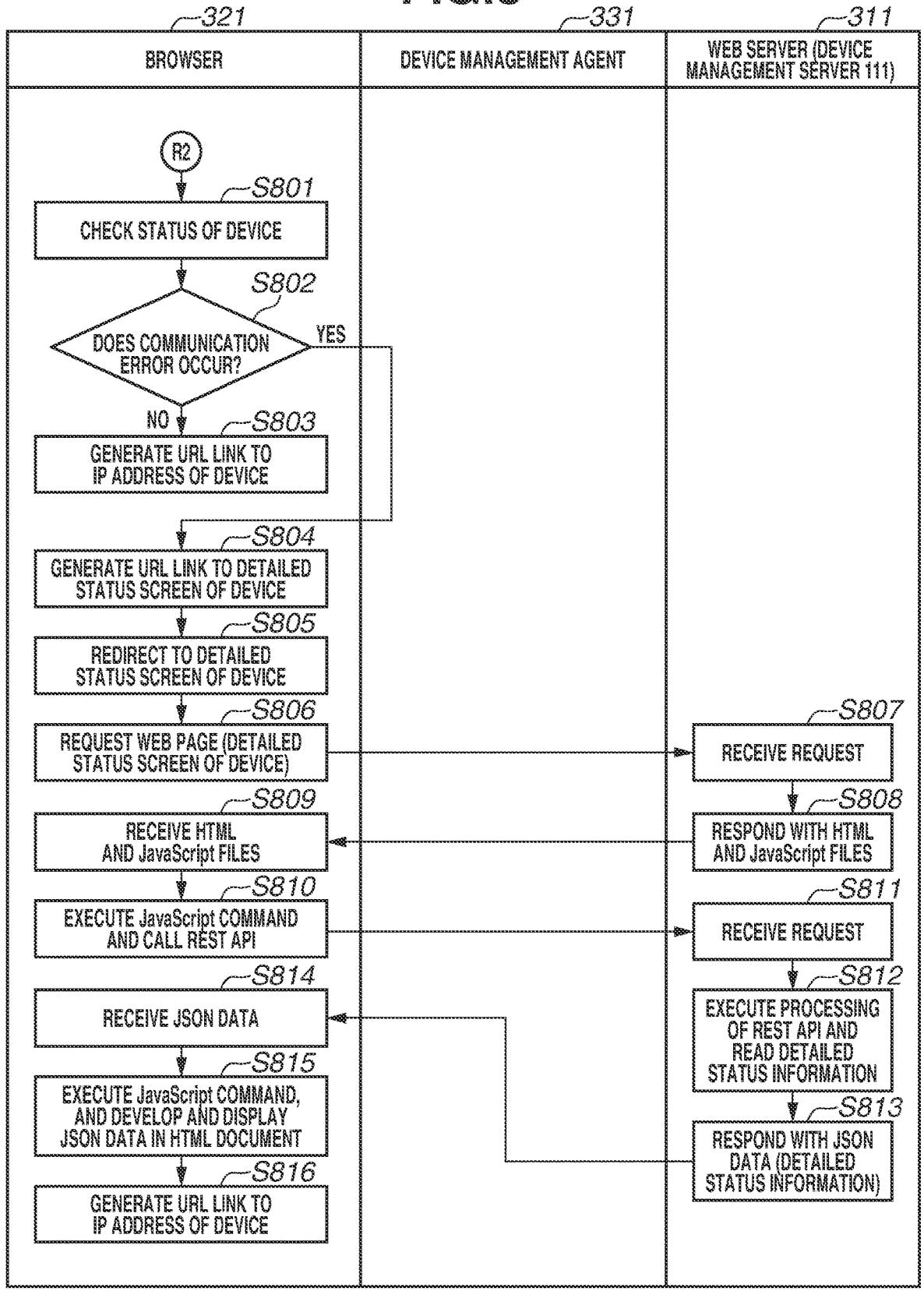

FIG.9A

DEVICE MANAGEMENT SERVICE — 900

CUSTOMER TENANT NAME: XYZ COMPANY LIMITED    CUSTOMER TENANT ID: 1055AA — 901

DEVICE LIST — 902

| SERIAL NUMBER | MANUFACTURER | PRODUCT NAME | IP ADDRESS | STATUS | DEVICE TYPE | AGENT TO COMMUNICATE |
|---|---|---|---|---|---|---|
| IMR83220 | α | OfficePrinter 6 | 192.168.9.101 | OPERATING | MFP | Dev Agent 101 |
| IMR83221 | α | OfficePrinter 6 | 192.168.9.102 | OPERATING ⚠ | MFP | Dev Agent 102 |
| PCY75518 | α | imageRUNNER C7 | 192.168.9.103 | COMMUNICATION FAILED ⊗ | MFP | Dev Agent 103 |
| JBL97122 | α | BussinessLaser J1 | 192.168.9.201 | OPERATING | SFP | Dev Agent 101 |
| IJB30018 | α | BussinessIJ J8 | 192.168.9.202 | OPERATING | BIJ | Dev Agent 101 |
| IJB49201 | α | BussinessIJ J7 | 192.168.9.31 | OPERATING | BIJ | Dev Agent 101 |
| ... | ... | ... | ... | ... | ... | ... |

903

MANAGEMENT SYSTEM AND CONTROL METHOD

BACKGROUND OF THE INVENTION

Field of the Invention

The present disclosure relates to a management system for managing device information, and a control method.

Description of the Related Art

Sales companies and dealers offer services for conducting management, maintenance, and support operations of printers installed in organizations such as a company and an association on behalf of customers. Such services are called managed print services (MPS) or managed document services (MDS). To provide MPS or MDS for a customer, a device management application for managing a list of devices in a customer network of a company or association and finding out a use history, an operation status, and an error state of each device is used. In a conventional configuration, a device management server is often installed in the customer network to manage a list of devices in the customer network.

According to Japanese Patent Application Laid-Open No. 2003-330824, network management software runs on a World Wide Web (WWW) server, which receives a request for acquisition of information about a device to be managed from a web browser. The WWW server then obtains a Uniform Resource Locator (URL) of a web page provided by the device to be managed from the device to be managed. If the obtained URL is determined to be effective, the WWW server transmits temporary information, which is the obtained URL formatted in a Hypertext Markup Language (HTML) form, to the web browser.

With the recent progress of Internet services and cloud services, device management applications are now provided by web servers on the Internet. An example of device information is an Internet Protocol (IP) address. Devices such as recent printers often include a web server implemented inside. A browser can access the IP address of a device to refer to device information and change device settings.

When a web page provided by a management server managing the foregoing device information displays device management information, not only the IP address but a URL link to the IP address may be displayed as well.

Suppose that a client computer on which the browser accessing the management server to display the web page is running exists in the customer network and can communicate with the device having the IP address. In such a case, the URL link functions properly. More specifically, if the URL link is clicked and the browser is redirected to the URL of the in-apparatus web server, the browser can access the in-apparatus web server of the device having the IP address. According to the foregoing Japanese Patent Application Laid-Open No. 2003-330824, a personal computer (PC) having the web browser and the WWW server on which the network management software runs are connected by a local area network (LAN).

Now, suppose that the client computer has an effective Internet connection and can access the device management web server (management server), but is not connected to the customer network or able to communicate with the IP address of the device. In such a case, the URL link does not function properly. More specifically, if the browser is redirected to the URL of the web server from the URL link, the communication with the intended IP address may time out or the browser may connect to a different web server that exists in another network and has the same IP address. In particular, networks in respective customers are private networks. Private IP addresses defined by Request for Comments (RFC) 1918 (for example: in Class C, 192.168.0.0 to 192.168.255.255) are used in various network systems in respective customers. The possibility of redirecting the browser to a wrong web server is a security concern.

SUMMARY OF THE INVENTION

The present disclosure is directed to providing a mechanism for enabling restriction of access from an information processing terminal to a web server implemented on a device.

According to an aspect of the present disclosure, a management system configured to manage device information responds, if an acquisition request for device information is received from an information processing terminal, to the information processing terminal with information for displaying the device information and script information including a command to cause the information processing terminal to check whether access to a web server implemented on the device is permitted. The information processing terminal is configured to, if the access to the web server implemented on the device is not permitted due to execution of the command included in the script information, be restricted from accessing the web server implemented on the device.

Further features of the present disclosure will become apparent from the following description of exemplary embodiments with reference to the attached drawings.

BRIEF DESCRIPTION OF THE DRAWINGS

FIG. 3 is a diagram illustrating an example of software and hardware configurations of the system.

FIGS. 4A and 4B are diagrams illustrating examples of web pages provided by a device management server.

FIGS. 5A and 5B are diagrams illustrating examples of web pages provided by the device management server.

FIG. 6 is a flowchart illustrating a processing flow for checking whether access to web servers implemented on devices is permitted.

FIG. 7 is a flowchart illustrating a processing flow for checking whether access to web servers implemented on devices is permitted.

FIG. 8 is a flowchart illustrating a processing flow for checking whether access to a web server implemented on a device is permitted.

FIGS. 9A and 9B are diagrams illustrating examples of web pages provided by a device management server according to a second exemplary embodiment.

DESCRIPTION OF THE EMBODIMENTS

A mode for carrying out the present disclosure will be described below with reference to the drawings.

Figure 1:
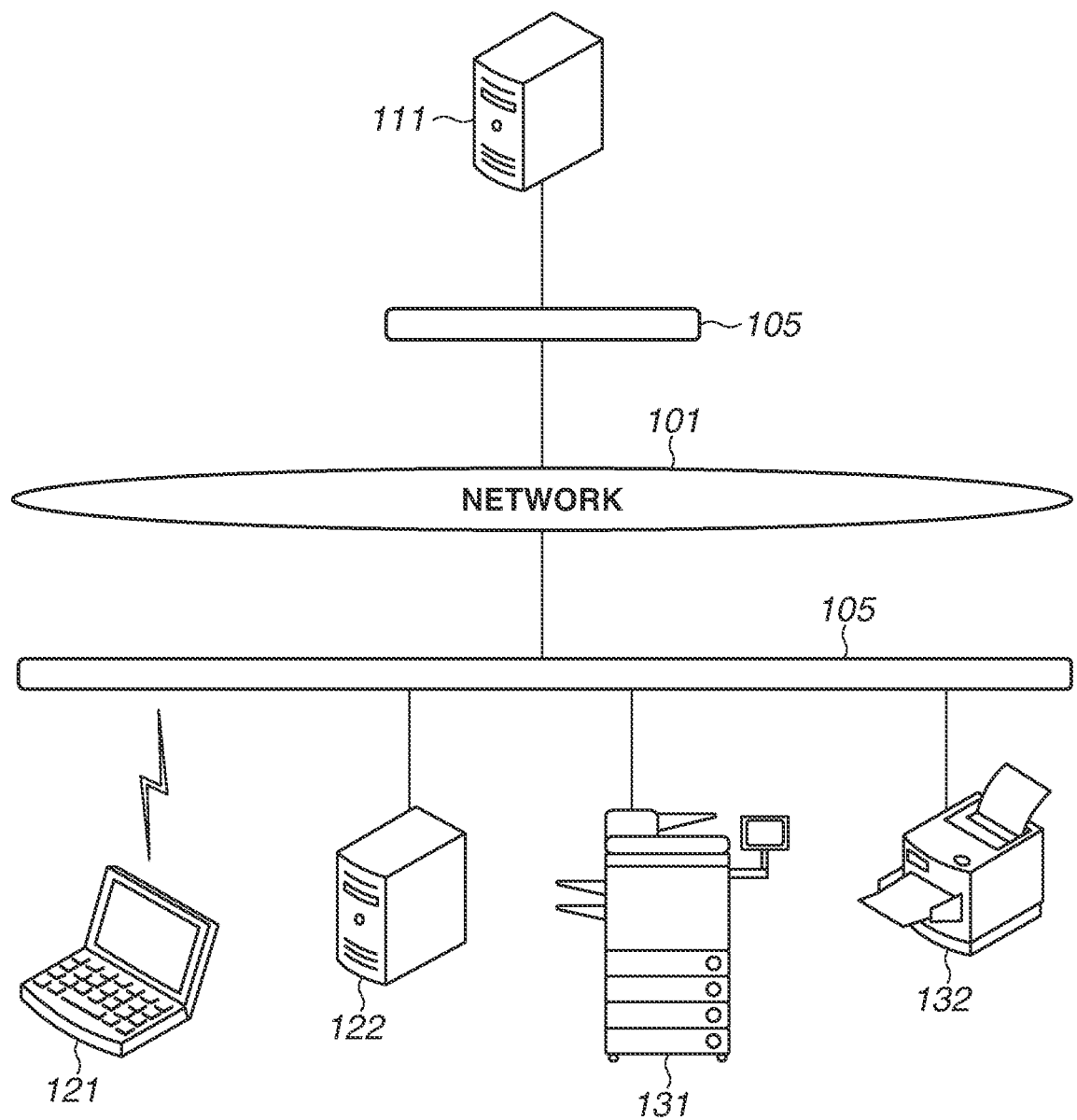
FIG. 1 is a diagram illustrating an example of a system configuration and a network configuration.

A first exemplary embodiment will be described below. FIG. 1 illustrates an example of a system configuration and a network configuration for carrying out the present disclosure. In a system according to the present exemplary embodiment, a device management web server on the Internet manages a list of devices in a customer network. An application called a device management agent is installed and run on one or a plurality of computers in the customer network. If a device is searched for and found, the device management agent starts to monitor the device, and collects and transmits device data, such as a use history, an operation status, and an error state, to the device management web server. A user of a sales company or a customer user connects and logs in to the device management web server by using a browser of a client computer, and refers to a list of the customer's devices and the usage and statuses of various devices.

An example of a network 101 is the Internet. A network 105 is a private network or a local area network (LAN). A device management server (device management web server) 111 functions as a management system according to the present exemplary embodiment. The device management server 111 may be a system constructed on cloud. Computers 121 and 122 are information processing terminals such as a personal computer (PC), a laptop computer, a tablet computer, and a smartphone. Examples of network devices (hereinafter, referred to as devices) 131 and 132 include an office multifunction peripheral, a printer, a network camera, a digital medical instrument, and a molding apparatus. In the present exemplary embodiment, the devices 131 and 132 will be described by using printing apparatuses like an office multifunction peripheral and a printer as examples. In the configuration according to the first exemplary embodiment, the computer 122 is a relay apparatus having a function as a device management agent. The computer 122 monitors the devices 131 and 132, and transmits collected device information to the device management web server.

Figure 2:
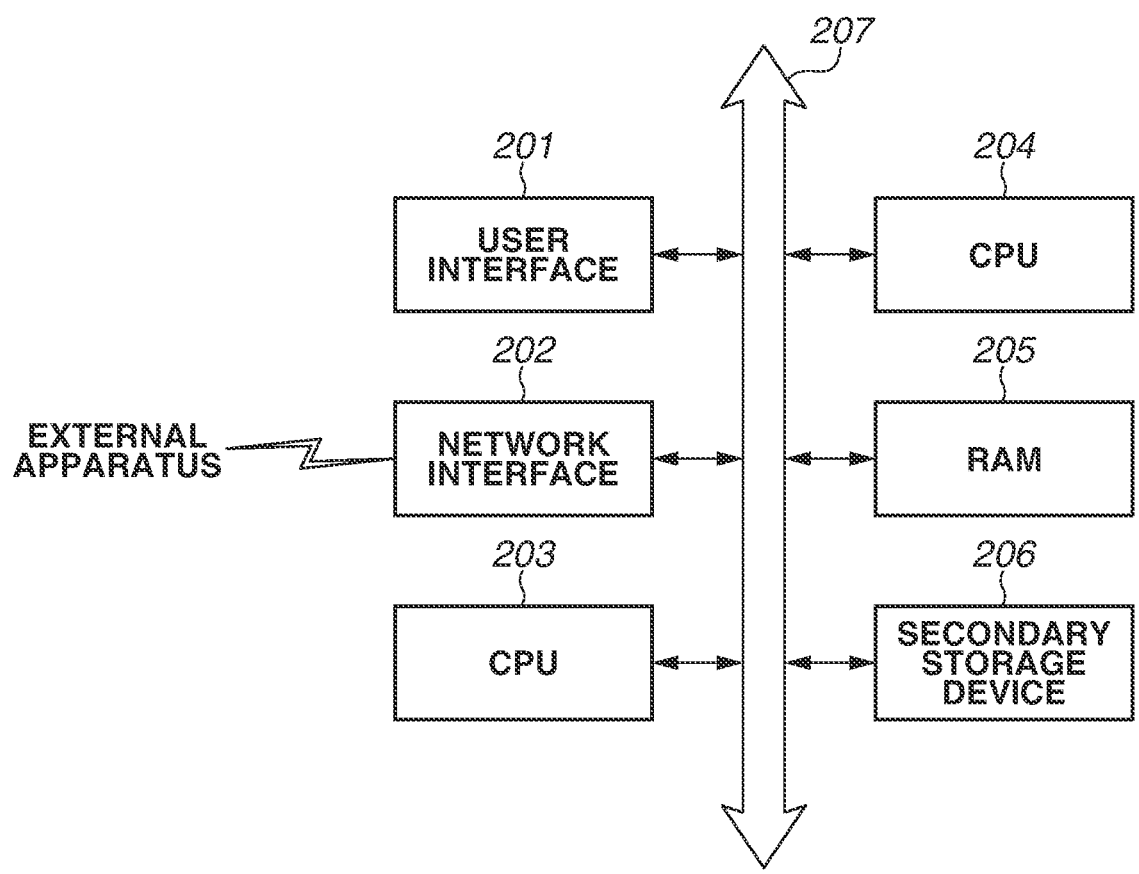
FIG. 2 is a diagram illustrating an example of a module configuration of information processing functions.

FIG. 2 is a module configuration diagram illustrating information processing functions of the device management server 111, the computers 121 and 122, and the devices 131 and 132. A user interface 201 inputs and outputs information and signals via a display, a keyboard, a mouse, a touch panel, and a button or buttons. A computer without such hardware may be connected to and operated from another computer via a remote desktop or a remote shell. A network interface 202 connects to a network such as a LAN, and performs communication with other computers and network apparatuses. Both wired and wireless communication methods may be used.

A built-in program and data are recorded in a read-only memory (ROM) 204. A random access memory (RAM) 205 is a temporary memory area. Examples of a secondary storage device 206 include a hard disk drive (HDD) and a flash memory. A central processing unit (CPU) 203 executes programs read from the ROM 204, the RAM 205, and the secondary storage device 206. Such units 201 to 206 are connected via an internal bus 207.

FIG. 3 is a diagram illustrating an example of software and hardware configurations of the present system. Pieces of software installed on the pieces of hardware are executed by the respective CPUs 203. The pieces of software are configured to be capable of communicating with each other as illustrated by the arrows of network connection.

A web server 311 is installed on the device management server 111. A representational state transfer (REST) application programming interface (API) 312 is provided by the web server 311. A web user interface (UI) 313 is provided by the web server 311. Collected data is saved and stored in a data store 314.

A browser 321 is installed on the computer 121. The browser 321 accesses web servers and displays HTML documents.

A device management agent 331 is installed on the computer 122 or the device 131. The device management agent 331 includes a device management application 332 and a web server 333. The device management application 332 collects data from the devices 131 and 132, and transmits the collected data to the device management server 111. The browser 321 can access the web server 333 to refer to information about the device management agent 331 and change settings. Data collected by the device management agent 331 is saved and stored in a data store 334.

The devices 131 and 132 include a log recording unit 341. The devices 131 and 132 further include a log storage 342. The log recording unit 341 records operation logs and statuses of the device 131 or 132, including an operation history, an error history, and a consumable state, in the log storage 342. An API 343 is intended to obtain data recorded in the log storage 342. The devices 131 and 132 include a web server 344. The browser 321 can access the web server 344 to refer to information about the device 131 or 132 and change settings.

A processing flow in which the device management agent 331 obtains device data from the devices 131 and 132 and transmits the device data to the device management server 111 in the present system will be described. The device management application 332 searches for devices 131 and 132 within a communicable network by using a communication protocol such as Simple Network Management Protocol (SNMP). If the devices 131 and 132 are detected, the device management application 332 starts monitoring by using SNMP. The device management application 332 communicates with the APIs 343 to obtain device data as needed. The obtained device data is stored in the data store 334. Data of relatively high urgency, such as error information, is immediately transmitted to the device management server 111. Data such as an operation history is transmitted to the device management server 111 on a regular basis. In transmitting the device data, the device management application 332 transmits a registration request for the device data to the REST API 312. The REST API 312 saves the received device data in the data store 314. The user of the device management server 111 uses the browser 321 to access the web server 311, displays a device management screen, and executes browsing, data editing, and data change. Here, the browser 321 obtains files constituting a web page, such as an HTML file and JavaScript (registered trademark) file, from the web UI 313. The browser 321 executes a command in the obtained JavaScript file, transmits a data acquisition request to the REST API 312, and obtains data needed to display the web page. Receiving the data acquisition request, the REST API 312 searches the data store 314 to obtain needed data, and responds to the browser 321. According to a command in the JavaScript file, the browser 321 generates an HTML document in which the obtained data is embedded, and displays the web page.

FIGS. 4A, 4B, 5A, and 5B illustrate examples of web pages provided by the device management server 111. FIG. 4A illustrates a device list screen 400. The device list screen 400 may display information about one device.

A field 401 displays a customer tenant name and a customer tenant identifier (ID) of a customer tenant to be displayed. A tenant refers to a dedicated storage area separated for each user company or organization in publishing and providing web services on the Internet. In cloud services, web services and back-end data stores are allocated and stored on computing resources in which data on all customers is shared. If a customer accesses information managed by the device management server 111, the customer can only access data in the tenant the customer belongs to. Access to other tenants is restricted.

If various customers are registered and managed by the device management server 111, the field 401 displaying the customer tenant name and customer tenant ID indicates that data of one of the tenant-separated customers is being referred to. A device list 402 lists devices managed in the foregoing customer tenant. The device list 402 can be referred to for data such as device information and statuses.

FIG. 4B illustrates a device management agent screen 410 which displays a list of device management agents managed in the customer tenant. The device management agent screen 410 can be referred to for data such as agent information and statuses.

FIG. 5A illustrates a device list screen 500 similar to the device list screen 400. Like the device list 402, a device list 502 lists devices managed in the customer tenant. The device list 502 can be referred to for data such as device information and statuses. A column 503 displays the IP addresses of the devices. A difference from the device list screen 400 is that URL links are generated for the IP addresses of some of the devices. In the column 503, an underlined IP address indicates that a URL link is set for the IP address. The URL is destined for the IP address of the web server 344 of the device 131 or 132. For example, if the IP address of the web server 344 of the device 131 or 132 is 192.168.0.201, the destination URL is http://192.168.0.201.

FIG. 5B illustrates an example of a device's detailed status screen 510 which is displayed if a URL for which a link destination is set in the column 503 is selected. A field 511 displays various types of device information. A field 512 displays detailed statuses and histories, such as information about errors and consumables. A message display field 514 indicates that this device does not respond to a communication request from the device management agent 331 and a communication failed error has occurred. A field 513 displays an IP address like the column 503.

A processing flow according to the first exemplary embodiment will be described with reference to the flowchart of FIG. 6. The processing illustrated in the flowchart of FIG. 6 is implemented by the CPU 203 of each apparatus reading and executing a program recorded in the ROM 204 or the secondary storage device 206. The same applies to the subsequent flowcharts.

In step S601, the browser 321 transmits a request for the acquisition of a web page (screen information) of a device list or device information to the web server 311 of the device management server 111 based on an instruction from the user.

For example, if the web server 311 has a fully qualified domain name (FQDN) "www.device-management-cloud.company", examples of the URL and an HTTP request are as follows:
URL:
https://www.device-management-cloud.company/site/devices/HTTP request (excerpt):
GET/site/devices/HTTP/1.1
Host: www.device-management-cloud.company In step S602, the web server 311 receives the request from the browser 321, and determines whether the request is a proper one from the user. An example of a method for determining whether the request is a proper one from the user is to use an Authorization field of the HTTP request header. In an example of implementation, an authorization token indicating an authenticated user may be set in the Authorization field, and verified on the web server side. If the request received in step S602 is determined to be a proper one, the processing proceeds to step S603.

In step S603, the web server 311 responds to the browser 321 with files constituting a web page, such as HTML and JavaScript files. In step S604, the browser 321 receives the HTML and JavaScript files from the web server 311. In step S605, the browser 321 executes a JavaScript command and calls the REST API 312 to obtain data needed to configure the web page. In step S606, the web server 311 receives a request for the REST API 312, and determines whether the request is a proper one from the user like step S602. If the request received in step S606 is determined to be a proper one, the processing proceeds to step S607.

In step S607, the web server 311 executes the requested processing of the REST API 312. The web server 311 reads device information or agent information specified by a Uniform Resource Identifier (URI) in the request or the request header or body from the data store 314. In step S608, the web server 311 responds to the browser 321 with data converted into a data description language such as JavaScript Object Notation (JSON).

An example of the data on the device information is given below in a JSON format.

```
{
    "device" : [
        {
            "serial-number" : "MDX78461",
            "manufacturer-name" : "α",
            "product-name" : "OfficePrinter5",
            "ip-address" : "192.168.0.201",
            "device-status" : "operating",
            "error-level": "none",
            "device-type": "MFP",
            "monitoring-agent-id"  :  "6c3ec85e-5078-11e6-beb8-9e71128cae77"
        },
        {
            "serial-number" : "PMD22670",
            "manufacturer-name" : "α",
            "product-name" : "LBP 8R",
            "ip-address" : "192.168.0.202",
            "device-status" : "operating",
            "error-level" : "warning",
            "device-type" : "MFP",
            "monitoring-agent-id"  :  "6c3ec85e-5078-11e6-beb8-9e71128cae77"
        },
        {
            "serial-number" : "OLY37552",
            "manufacturer-name" : "α",
            "product-name" : "PhotoDevice P1",
            "ip-address" : "192.168.0.203",
            "device-status" : "communication-error",
            "error-level" : "error",
            "device-type" : "LFP",
            "monitoring-agent-id"  :  "6c3ec85e-5078-11e6-beb8-9e71128cae77"
        }
    ]
}
```

An example of the data on the agent information is given below in a JSON format.

```
{
    "agent" : [
        {
            "agent-type" : "PC Agent",
            "version" : "5.0.2",
            "agent-id"    :    "6c3ec85e-5078-11e6-beb8-9e71128cae77",
            "agent-name": "PC Agent 001",
            "ip-address" : "192.168.0.11",
            "agent-status" : "operating",
            "last-communication-datetime" : "2016-07-23T11:23:55",
            "number-of-monitoring-devices" : 52
        },
        {
            "agent-type" : "PC Agent",
            "version" : "5.0.5",
            "agent-id"    :    "000530b1-8ad1-45c5-a22c-32d11b3f2534",
            "agent-name": "PC Agent 002",
            "ip-address" : "192.168.1.71",
            "agent-status" : "operating",
            "last-communication-datetime" : "2016-07-23T12:45:03",
            "number-of-monitoring-devices" : 28
        },
        {
            "agent-type" : "Device Agent",
            "version" : "5.0",
            "agent-id" : "PRD20168",
            "agent-name": "Dev Agent 101",
            "ip-address" : "192.168.5.31",
            "agent-status" : "operating",
            "last-communication-datetime" : "2016-07-22T22:05:01",
            "number-of-monitoring-devices" : 5
        }
    ]
}
```

In step S609, the browser 321 receives the JSON data. In step S610, the browser 321 executes a command in the JavaScript file, and develops and displays the received JSON data in the HTML document. As a result, the browser 321 displays a web page for displaying the device information or agent information like the device list screen 400 or the device management agent screen 410.

The processing of steps S611 to S619 is intended to generate URL links to the IP addresses of the devices 131 and 132 in the column (IP address display field) 503 of the devices 131 and 132 in the device list screen 500. In step S611, the browser 321 executes a command in the JavaScript file and identifies the device management agent 331 monitoring the devices to be displayed on the web page. In the foregoing example of the JSON data, the device with a serial number "MDX78461" is monitored by the device management agent 331 having an agent ID "6c3ec85e-5078-11e6-beb8-9e71128cae77". The IP address of the device is 192.168.0.201. The device management agent 331 has an agent name "PC Agent 001" and an IP address of 192.168.0.11.

Here, the browser 321 desirably checks the IP addresses of the devices 131 and 132 for communication connectivity, and generates URL links to only the IP addresses of devices succeeding in the communication connectivity check. As described above, the FQDN of the web server 311 of the device management server is www.device-management-cloud.company. Since the devices 131 and 132 exist in the customer network which is a private network, their IP addresses and host names serve as the addresses of the web servers 344. In view of HTTP communication, such a communication procedure is cross domain communication. That is, the browser 321 displays the web page of the web server 311 of the device management server 111, and communicates with the IP addresses of the devices 131 and 132 in a different domain based on JavaScript commands in the web page.

Implementing the cross domain communication function with the web server 311 of the device management server 111 on the devices 131 and 132 themselves has the following difficulties or problems. Depending on manufacturers and models, such a new function is difficult to be implemented afterward. Even if the function is defined as an industry standard, it takes a long time for all manufacturers to support the standard. The standard may be left unsupported by some manufacturers or models.

The device management agent 331 which constantly monitors the devices 131 and 132 and transmits data to the device management server 111 is then utilized to determine whether the computer 121 can communicate with the devices 131 and 132.

As a precondition, the web server 333 of the device management agent 331 is equipped with a function for accepting the foregoing cross domain communication from the web server 311 of the device management server 111. In the present exemplary embodiment, a processing flow using cross-origin resource sharing (CORS), which is a standard technique for cross domain communication, will be described. To permit cross domain communication, a reliable domain needs to be set as an origin domain serving as a transfer source. The browser 321 permits the web server 333 to perform communication with the domain "www.device-management-cloud.company" of the web server 311 of the device management server 111 as the origin domain. It is not recommendable in terms of security to rely on an unknown third-party domain. The device management agent 331 is a client that transmits data to the device management server 111 via the REST API 312. The device management server 111 and the device management agent 331 thus have a server-client trusting relationship in the first place, and there is no problem in permitting the domain of the web server 311 of the device management server 111.

In step S612, the browser 321 executes a command in the JavaScript file and transmits a communication connectivity check request to the web server 333 of the device management agent 331. If the communication procedure is determined to be cross domain communication, the browser 321 sets the origin domain by appending an origin field to the HTTP request header. Examples of the communication destination URL and the HTTP request are as follows:
URL:
https://192.168.0.11/agent/api/echo/HTTP
request (excerpt):
POST/agent/api/echo/HTTP/1.1
Host: 192.168.0.11
Origin: https://www.device-management-cloud.company In step S613, if there is no response to the request from the communication destination IP address, the computer 122 is determined to not exist in a network communicable with the computer 121. No URL link to the IP addresses of the devices to be managed by the device management agent 331 is then generated.

In step S614, the web server 333 of the device management agent 331 receives the communication connectivity check request from the browser 321. In step S615, the web server 333 reads the origin field set in the HTTP request header. In step S616, the web server 333 determines whether the origin domain is the domain "www.device-management-cloud.company" of the web server 311 of the device management server 111, which is stored as a permitted origin domain. If the determination in step S616 is NO (NO in step S616), the processing proceeds to step S617. In step S617, the web server 333 responds with an error response. In the case of the error response, the processing proceeds to step S613. In step S613, the browser 321 generates no URL link to the IP addresses of the devices to be managed by the device managing agent 331. If the determination in step S616 is YES (YES in step S616), the processing proceeds to step S618. In step S618, the web server 333 responds with an OK response. An example of the HTTP response in such a case is as follows:
HTTP/1.1 200 OK
Access-Control-Allow-Origin: https://www.device-management-cloud.company
The Access-Control-Allow-Origin header field is a field describing the origin domain to be permitted, defined in CORS.

In step S619, the browser 321 executes a command in the JavaScript file and generates URL links to the IP addresses of the devices to be managed by the device management agent 331.

By the foregoing processing, the URL links to the IP addresses of the devices to be managed by the device management agent 331 can be dynamically generated only if communication connectivity from the browser 321 to the web server 333 of the device management agent 331 is confirmed. In such a case, the computer 121 can determine that the computer 122 and the devices 131 and 132 exist in the same private network. In other words, if the user clicks the URL links to the web servers 344 of the devices 131 and 132 on the browser 321, the browser 321 can access the web servers of the intended devices 131 and 132. It should be noted that the determinations may have exceptions in some cases. Depending on network, router, and firewall settings, communications from/to some communication source or destination addresses and port numbers may be blocked even within the private network. Except a few such exceptional cases, the URL links function properly for improved user convenience.

Now, an operation performed when the computer 121 moves to another network after the URL links to the IP addresses of the devices are generated in step S619 will be described. Suppose that the computer 121, like a smartphone, detects a change in positional information by the Global Positioning System (GPS) or a motion sensor. In such a case, the web page may be reloaded to perform the processing from step S601 again. The URL links to the IP addresses of the devices can thus be controlled to be enabled or disabled according to the latest network location of the computer 121. If the computer 121 is an ordinary computer not capable of obtaining positional information, the web page may be reloaded on a regular basis to update the displayed web page to the latest state.

Next, an additional processing flow for checking the agent IDs of device management agents will be described with reference to the flowchart of FIG. 7. In the processing flow illustrated in FIG. 6, only IP addresses are used as information for identifying each individual device management agent. If there are device management agents to which the same IP addresses are assigned in respective different private networks, the following problem occurs. The computer 121 can perform a communication connectivity check with a wrong device management agent 331, depending on which network the computer 121 exists in.

To solve such a problem, a communication connectivity check is performed by using not only the IP address of the computer 122 on which the device management agent 331 runs, but the agent ID as well. The processing proceeds from a reference point R1 of FIG. 6 to step S701 of FIG. 7. In step S701, the web server 333 of the device management agent 331 responds to the communication connectivity check request with an OK response including the agent ID. In step S702, as processing inside JavaScript, the browser 321 compares the agent ID of the device management agent 331 identified in step S611 with the responded agent ID. In step S703, the browser 321 determines whether the agent IDs coincide with each other. If the determination in step S703 is NO (NO in step S703), the processing proceeds to step S704. In step S704, like step S613, the browser 321 generates no URL link to the IP addresses of the devices. If the determination in step S703 is YES (YES in step S703), the processing proceeds to step S705. In step S705, like step S619, the browser 321 generates URL links to the IP addresses of the devices to be managed by the device management agent 331.

Next, an additional processing flow for checking the statuses of the devices when generating URL links to the IP addresses of the devices will be described with reference to the flowchart of FIG. 8. As described above, even if the browser 321 succeeds in the communication connectivity check with the device management agent 331, one or some of the devices to be managed may be powered off or temporarily out of the network. In such cases, the URL links generated to the IP addresses of such devices can cause a communication error when the URL links are clicked.

To solve such a problem, there is provided a unit for handling a device that can cause a communication error differently by using status information about the devices, transmitted from the device management agent 331 to the device management server 111. The processing proceeds from a reference point R2 of FIG. 6 to step S801 of FIG. 8.

In step S801, as processing inside JavaScript, the browser 321 checks the status of each device in the JSON data on the received device information. In step S802, the browser 321 refers to the JSON data and determines whether the device has data "device-status" "communication-error", i.e., whether a communication error has occurred in the device. If the determination in step S802 is NO (NO in step S802), the processing proceeds to step S803. In step S803, like step S619, the browser 321 generates a URL link to the IP address of the device. If the determination in step S802 is YES (YES in step S802), the processing proceeds to step S804. In step S804, unlike step S803, the browser 321 generates a URL link to the detailed status screen 510 of the device in the IP address display field 503 of the device list screen 500. In step S805, if the URL link to the detailed status screen 510 is clicked, the browser 321 executes URL redirection. In step S806, the browser 321 requests the web page of the detailed status screen 510 of the device from the web server 311 of the device management server 111. In step S807, the web server 311 receives the request, and determines whether the request is a proper one from the user. If the request is determined to be a proper one, then in step S808, the web server 311 responds with files constituting the web page, including HTML and JavaScript files. In step S809, the browser 321 receives the files such as the HTML and JavaScript files from the web server 311. In step S810, the browser 321 executes a JavaScript command and calls the REST API 312 to obtain data needed to configure the web page. In step S811, the web server 311 receives the request for the REST API 312 from the browser 321 and determines, like step S807, whether the request is a proper one from the user. If the request is determined to be a proper one, the web server 311 executes the requested processing of the REST API 312. In step S812, the web server 311 reads detailed status information about the device information from the data store 314. In step S813, the web server 311 converts the data into a data description language such as JSON and responds to the browser 321. In step S814, the browser 321 receives the JSON data from the web server 311. In step S815, the browser 321 executes a command in the JavaScript file and develops and displays the received JSON data in the HTML document. As a result, the browser 321 displays a web page displaying detailed device information on the detailed status screen 510. The developed and displayed result of the received JSON data includes the field (device information display field) 511 and the field (detailed status display field) 512. Here, the message display field 514 displays a message to call attention to the detection of a communication error in the device by the device management agent 331. In step S816, the browser 321 generates the URL link to the IP address of the device in the field 513.

By the processing of the flowchart of FIG. 8, the following additional processing can be performed in addition to the processing described in the flowchart of FIG. 6 if there is a device of which the status is a communication error. If the device in question has the status of a communication error, the browser 321 can be redirected to the detailed status screen 510 of the device to display the message to call attention and provide the URL link to the IP address of the device.

In the present exemplary embodiment, as described above, when the browser 321 displays the web page provided by the web server 311 of the device management server 111, the following operation can be performed. The browser 321 performs a communication connectivity check with the device management agent 331 based on the script information included in the response from the device management server 111. If the computer 121 on which the browser 321 is running and the devices 131 and 132 exist in the same private network, the communication connectivity check succeeds. The browser 321 then generates the URL links to the IP addresses of the devices 131 and 132 to be managed by the device management agent 331, and performs display control to enable access to the web servers 344 implemented on the devices 131 and 132. According to the present exemplary embodiment, URL links to IP addresses of devices to be displayed can be generated if a computer on which a browser is running is confirmed to exist in the same private network as the devices do.

Next, a second exemplary embodiment will be described with reference to FIGS. 9A, 9B, and 10. The second exemplary embodiment deals with a case in which the device management agent 331 is installed and run on one or a plurality of devices 131.

One of the advantages of the present exemplary embodiment is that the computer 122 for running the device management agent 331 does not need to be provided to monitor or manage the devices 131 and 132. Note that one or some of the devices 131 and 132 may be not capable of running an additional piece of software, depending on hardware and software specifications, limitations, and configurations.

Figure 9B:
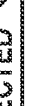
Figure 10:
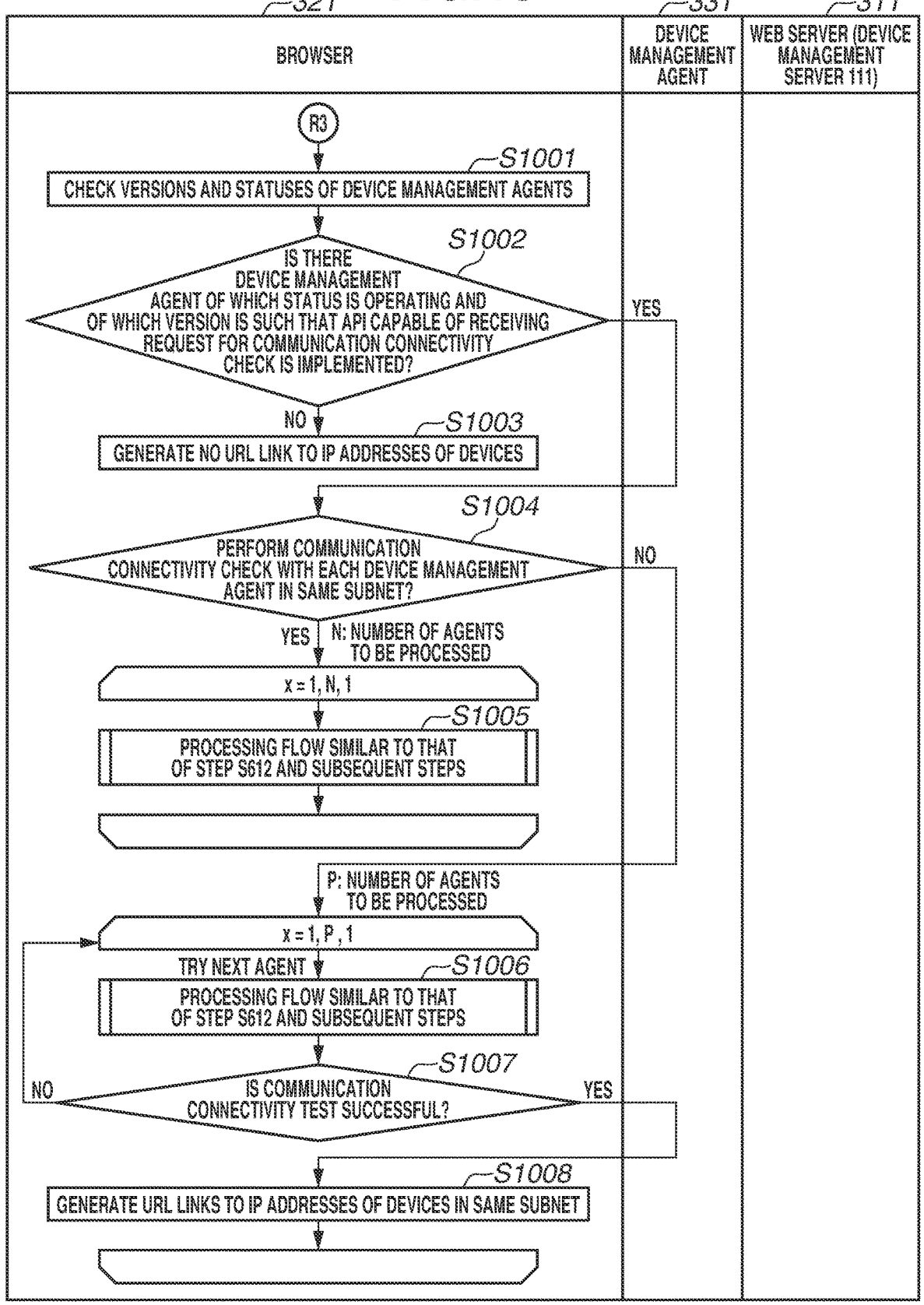
FIG. 10 is a flowchart illustrating a processing flow for checking whether access to web servers implemented on devices is permitted according to the second exemplary embodiment.

FIGS. 9A and 9B illustrate examples of web pages provided by the device management server 111. FIG. 9A illustrates a device list screen 900. Like the field 401, a field 901 displays a customer tenant name and a customer tenant ID of a customer tenant to be displayed. A device list 902 displays a list of devices managed in the foregoing customer tenant. The device list 902 can be referred to for data such as device information and statuses. A column 903 displays the IP addresses of the devices. FIG. 9B illustrates a device management agent list screen 910. A device management agent list 911 displays a list of device management agents managed in the customer tenant. The device management agent list 911 can be referred to for data such as agent information and statuses. Differences from the first exemplary embodiment will be described. In the second exemplary embodiment, the agent types of the device management agents installed on the devices 131, listed in the device management agent list 911, are a device agent. The agent types of the device management agents installed on the computers 122 in the first exemplary embodiment include a PC agent. The agent types are thus distinguished depending on the installation locations. The agent to communicate column in the device list 902 shows a relationship about which device management agent each device is managed by. Such a relationship can be further collated with the agent names and the IP addresses in the device management agent list 911 to check a relationship about which device is managed by the device manage agent 331 in which device. The device having a serial number of IMR83221 and the device having a serial number of PCY75518 obtain the operation log and status of the own devices and transmit the data to the device management server 111 by using the device management agent 331 in the own devices. The device having a serial number of IMR83220 obtains the operation logs and statuses of the own device and three other devices and transmits the data to the device management server 111 by using the device management agent 331 in the own device.

Suppose that the device management agent 331 is installed and operated on the device 131. A processing flow for generating URL links to the IP addresses of the devices in the device list screen 900 in such a mode will be described with reference to the flowchart of FIG. 10.

Initial processing is similar to the processing of steps S601 to S611 of FIG. 6 according to the first exemplary embodiment. The processing proceeds from a reference point R3 of FIG. 6 to step S1001 of FIG. 10. In step S1001, the browser 321 checks the versions and statuses of the device management agents 331 in the device management agent list 911 as processing inside JavaScript. In step S1002, the browser 321 determines whether there is a device management agent 331 of which the status is "operating" and of which the version is such that an API capable of receiving a request for a communication connectivity check is implemented. If the determination in step S1002 is NO (NO in step S1002), the processing proceeds to step S1003. In step S1003, the browser 321 generates no URL link to the IP addresses of the devices.

In step S1004, the browser 321 determines whether to perform a communication connectivity check on each device management agent in the same subnet. If the determination in step S1004 is YES (YES in step S1004), the processing proceeds to step S1005. In step S1005, the browser 321 performs a processing flow similar to that from step S612 in FIG. 6 on each of the devices on which a device management agent 331 is running. If a communication connectivity check with the device management agent 331 succeeds, the browser 321 generates URL links to the devices to be managed by the device management agent 331 in the column (IP address display column) 903 of the device list screen 900. If the determination in step S1004 is NO (NO in step S1004), the processing proceeds to step S1006. In step S1006, the browser 321 performs a processing flow similar to that from step S612 on one device in the same subnet. In step S1007, the browser 321 determines whether the communication connectivity check on each device on which a device management agent 331 is running is successful. If the determination in step S1007 is NO (NO in step S1007), the browser 321 tries a communication connectivity check request for a device management agent 331 on the next device. If the determination in step S1007 is YES (YES in step S1007), the processing proceeds to step S1008. In step S1008, the browser 321 generates URL links to the IP addresses of the devices in the same subnet in the IP address display column 903 of the devices on the device list screen 900.

In the present exemplary embodiment, the device management agent 331 is described to be installed on one or a plurality of devices 131. As described above, when the browser 321 displays the web page provided by the web server 311 of the device management server 111, the following operation can be performed. The browser 321 performs a communication connectivity check on each individual device if a device management agent of which the status is "operating" and of which the version is such that an API capable of accepting a communication connectivity check request is implemented is confirmed to exist. If the communication connectivity check is successful, the browser 321 generates the URL links to the IP addresses of the devices 131 and 132 to be managed by the device management agent 331. According to the present exemplary embodiment, URL links to the IP addresses of devices to be displayed can be generated if the computer 121 on which the browser 321 is running is confirmed to exist in the same private network as the devices do.

In the foregoing exemplary embodiment, URL links to the IP address of the devices are described to be generated. However, web server URLs may be generated in other forms as long as the URLs are effective. For example, effective web server URLs of the devices such as the host names and private domain FQDNs of the devices may be used instead of IP addresses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-218210, filed Nov. 8, 2016, which is hereby incorporated by reference herein in its entirety.

What is claimed is:

1. A management system including a device management server, an information processing terminal and a relay apparatus,
    wherein the device management server is configured to manage a plurality of devices using device information of the plurality of devices,
    wherein the relay apparatus is configured to monitor the plurality of devices that exist in a customer network and have a function for accepting cross domain communication,
    wherein the device management server comprises at least one memory storing first instructions and at least one processor executing the first instructions causing the device management server to:
    receive an acquisition request for the device information from the information processing terminal; and
    send, in response to the received acquisition request and to the information processing terminal, response data including information for displaying the device information and script information, wherein the script information includes a command to cause the information processing terminal to perform cross domain communication for checking whether access to a web server implemented on a device is permitted, and
    wherein the information processing terminal comprises at least one memory storing second instructions related to a web browser and at least one processor executing the second instructions causing the information processing terminal to:
    perform the cross domain communication to a web server of the relay apparatus by execution of the command included in the script information in the response data, wherein domain information corresponding to the device management server as a source of the response data is set in data which is transmitted in the cross domain communication;
    receive, from the web server of the relay apparatus, data including a determination, by the relay apparatus, using the domain information; and
    generate, when the determination included in the received data indicates a permission, a link for access to a web server implemented on a device monitored by the relay apparatus from among a plurality of devices corresponding to device information displayed based on the information included in the response data,
    wherein, when the determination included in the received data does not indicate the permission, the link for the access to the web server implemented on the device monitored by the relay apparatus is not generated.

2. The management system according to claim 1, wherein if the information processing terminal does not exist in the customer network and data in response to the performed cross domain communication is not received by the information processing terminal, the link for the access to the web server implemented on the device monitored by the relay apparatus is not generated.

3. The management system according to claim 1, wherein the response data further includes an identifier (ID) of the relay apparatus, and
wherein if the determination indicates the permission and the ID of the relay apparatus included in the response data coincides with an ID of the relay apparatus received from the relay apparatus, the link for the access to the web server implemented on the device monitored by the relay apparatus is generated.

4. The management system according to claim 1,
wherein the information processing terminal is configured to display a device list based on the information for displaying the device information, and
wherein the generated link for accessing the web server implemented on the device is provided in the device list.

5. The management system according to claim 1, wherein a screen displayed on the information processing terminal is updated according to movement of the information processing terminal or on a regular basis.

6. A control method for a management system including a device management server, an information processing terminal and a relay apparatus, wherein the device management server is configured to manage a plurality of devices using device information of the plurality of devices, wherein the relay apparatus is configured to monitor the plurality of devices that exist in a customer network and have a function for accepting cross domain communication, the control method comprising:

at the device management server:
receiving an acquisition request for the device information is received from the information processing terminal; and
sending, in response to the received acquisition request and to the information processing terminal, response data including information for displaying the device information and script information, wherein the script information includes a command to cause the information processing terminal to check perform cross domain communication for checking whether access to a web server implemented on a device is permitted, and
at the information processing terminal:
performing the cross domain communication to a web server of the relay apparatus by execution of the command included in the script information in the response data, wherein domain information corresponding to the device management server as a source of the response data is set in data which is transmitted in the cross domain communication;
receiving, from the web server of the relay apparatus, data including a determination, by the relay apparatus, using the domain information; and
generating, when the determination included in the received data indicates a permission, a link for access to a web server implemented on a device monitored by the relay apparatus from among a plurality of devices corresponding to device information displayed based on the information included in the response data,
wherein, when the determination included in the received data does not indicate the permission, the link for the access to the web server implemented on the device monitored by the relay apparatus is not generated.

* * * * *